United States Patent [19]
Stephens et al.

[11] Patent Number: 6,061,209
[45] Date of Patent: May 9, 2000

[54] POSITIONING SYSTEM FOR A MAGNETIC HEAD FOR A TAPE DRIVE

[75] Inventors: Fred O. Stephens; James D. Mundo, both of Loveland, Colo.

[73] Assignee: Hewlett-Packard Company, Palo Alto, Calif.

[21] Appl. No.: 09/069,477

[22] Filed: Apr. 29, 1998

[51] Int. Cl.[7] ..................................................... G11B 5/55
[52] U.S. Cl. ........................................... 360/106; 360/109
[58] Field of Search ...................................... 360/106, 109

[56] References Cited

U.S. PATENT DOCUMENTS

| | | | |
|---|---|---|---|
| 4,313,143 | 1/1982 | Zarr | 360/106 |
| 4,609,959 | 9/1986 | Rudi | 360/106 |
| 4,630,145 | 12/1986 | Thompson et al. | 360/77 |
| 4,647,994 | 3/1987 | Irwin et al. | 360/85 |
| 4,713,707 | 12/1987 | Heizmann | 360/106 |
| 4,747,004 | 5/1988 | Kukreja et al. | 360/106 |
| 4,750,068 | 6/1988 | Akasaki et al. | 360/106 |
| 4,833,558 | 5/1989 | Baheri | 360/106 |
| 4,858,047 | 8/1989 | Cannon et al. | 360/106 |
| 4,943,877 | 7/1990 | Cannon et al. | 360/106 |
| 5,331,490 | 7/1994 | Richards et al. | 360/109 |
| 5,537,275 | 7/1996 | Peace et al. | 360/106 |

*Primary Examiner*—A. J. Heinz
*Attorney, Agent, or Firm*—Augustus W. Winfield

[57] ABSTRACT

A positioning system for a magnetic head for a tape drive has a tiltable lead screw between the magnetic head and a guide pin, providing reduced backlash with a low cost mechanism. Placing the lead screw between the magnetic head and the guide pin creates a pivot point at the guide pin, reducing backlash. Making the lead screw tiltable enables low precision, low cost mounting of the lead screw. Azimuth and zenith precision are controlled primarily by the guide pin, which is also low cost. Azimuth is adjustable by setting a screw that controls the angle between the drive chassis and the head motion system baseplate.

4 Claims, 7 Drawing Sheets

POSITIONING SYSTEM FOR A MAGNETIC HEAD FOR A TAPE DRIVE

FIELD OF INVENTION

This invention relates generally to magnetic tape drives and more specifically to a linear positioning system for a magnetic head for a tape drive.

BACKGROUND OF THE INVENTION

Magnetic tape used for data recording typically is one of two types: helical tracks (for example, Digital Audio Tape) in which tracks are written oblique to the direction of movement of the tape, or linear tracks, in which tracks are written parallel to the direction of movement of the tape. For linear tracks, a common drive configuration has a magnetic head with a single read/write gap positioned on a data track such that a head gap centerline is within a prescribed dimensional tolerance of the recorded track centerline. Positioning may be open loop, or track positioning information may be included on a tape for closed loop positioning.

There are two head positioning parameters of particular interest to the present application. One parameter is vertical position accuracy for the magnetic head. Typically, vertical position is controlled by a lead screw driven by a stepper motor, with many motor steps required to change the head position from one track to another. The second parameter of interest is the angle of the magnetic head relative to a line that is transverse to the direction of tape motion. If the line transverse to the direction of tape motion is defined as vertical, azimuth is the angle of the head, in the plane of the tape, relative to vertical, and zenith is the angle of the head, in a plane transverse to the plane of the tape, relative to vertical. Ideally, azimuth and zenith are zero.

One track positioning approach is illustrated by U.S. Pat. No. 4,747,004 (Kukreja et al.). In Kukreja et al., head azimuth and zenith are determined by the angle of the lead screw (pin 38 functions primarily to prevent rotation of the head carriage around the lead screw (yaw)). However, for lower drive height, it is useful to move the stepper motor off-axis from the lead screw, and for lowest cost, it is useful to allow the lead screw to adapt to misalignment instead of requiring a precision mount for the lead screw. See, for example, U.S. Pat. No. 5,537,275 (Peace et al.), which is incorporated herein by reference for all that it discloses and teaches. In Peace et al., the design permits the lead screw to tilt relative to a lower plate and to tilt relative to a upper plate, which in turn relaxes alignment requirements for the lead screw. Azimuth and zenith are then controlled by a separate low cost guide pin. The arrangement shown in Peace et al. reduces cost and lowers drive height, but introduces a hysteresis problem, as illustrated in FIGS. 1B–1C.

In FIG. 1A, a magnetic head is attached to a rigid arm 102. Arm 102 is driven by a lead screw 104 and a follower nut 106 threaded onto the lead screw. A guide pin (or functional equivalent) 108 helps keep the arm 102 aligned in azimuth and zenith. When the lead screw 104 rotates, the arm 102 moves vertically. The arrangement illustrated in FIG. 1A has an inherent limitation, as illustrated in FIGS. 1B and 1C. In FIG. 1B, the lead screw is rotating such that the arm 102 is moving vertically. However, due to mechanical tolerances and friction between the arm 102 and the guide pin 108, the arm pivots slightly around the guide pin (exaggerated in FIG. 1B for purposes of illustration) so that when the follower nut 106 is pushing the arm upward, the magnetic head 100 tilts down relative to the follower nut. When rotation of the lead screw is reversed, the arm 102 pivots in the opposite direction, as illustrated in FIG. 1C. As a result, when rotation of the lead screw 104 first reverses to cause movement of the head 100 to reverse from upward movement to downward movement, the head 100 actually continues to move upward as the arm 102 reverses its pivot angle around the guide pin 108. Therefore, as the lead screw reverses, there is hysteresis in the vertical movement of the head 100. There is a need for a head positioning device with low cost and reduced hysteresis.

SUMMARY OF THE INVENTION

A head positioning mechanism is provided that has the low cost tilting lead screw arrangement of Peace et al., but with substantially reduced hysteresis. In addition, the mechanism is modular, enabling the head positioning mechanism to be assembled separately and attached to a drive as a unit. A tilting lead screw is placed between a guide pin and the magnetic head. The lead screw is placed very close to the magnetic head. The guide pin is placed very close to the lead screw and the guide pin is along the centerline of the head and the lead screw. By placing the lead screw between the pivot point on the guide pin and the magnetic head, hysteresis is substantially reduced.

DETAILED DESCRIPTION OF THE PREFERRED EMBODIMENT OF THE INVENTION

Figure 2:
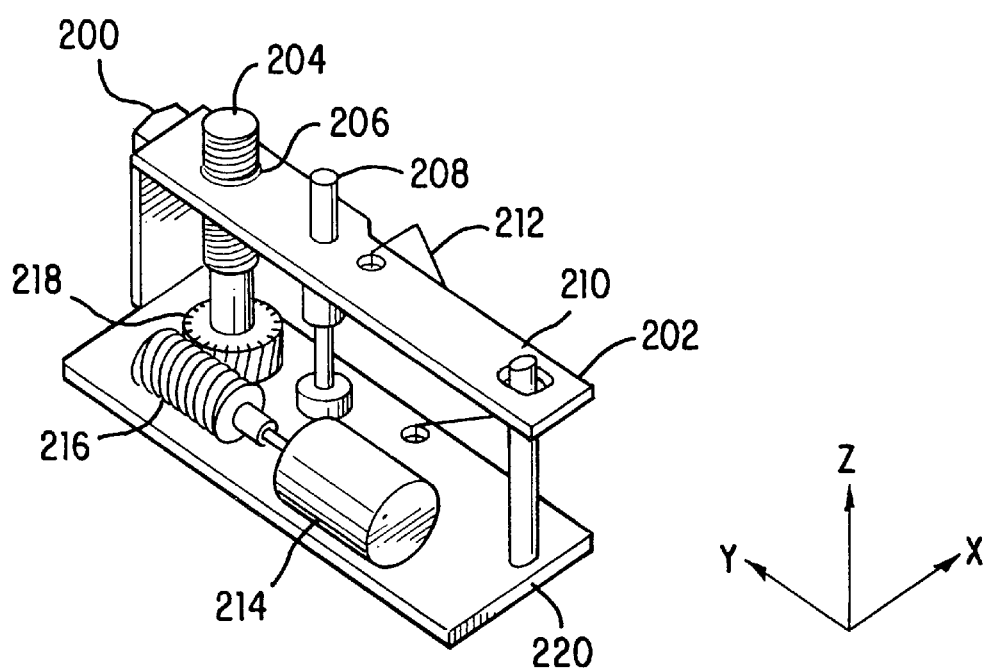
FIG. 2 is a upper right rear perspective view of an example embodiment of a head positioning mechanism in accordance with the invention.
Figure 3:
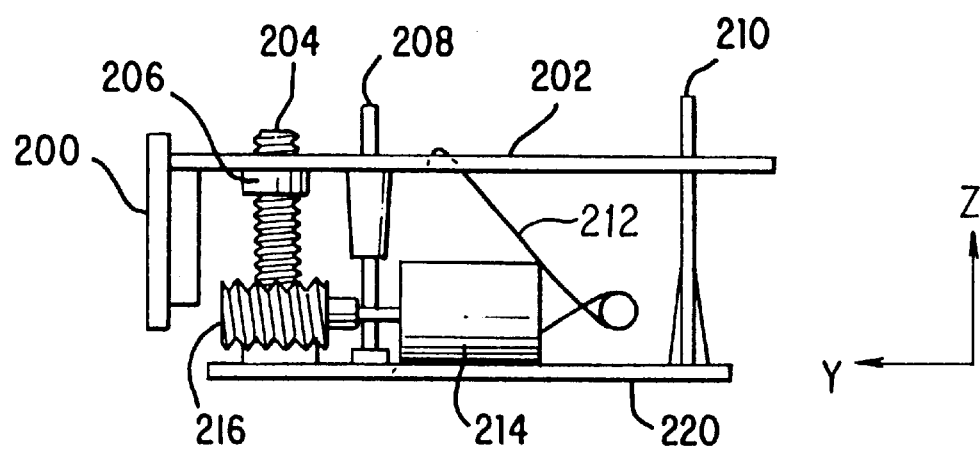
FIG. 3 is a right side view of the head positioning mechanism of FIG. 2.

FIG. 2 illustrates an example embodiment of a head positioning module in accordance with the invention. A magnetic head 200 is attached to an upper plate 202. A lead screw 204 and follower nut 206 move the upper plate and attached magnetic head vertically. A guide pin 208 controls head azimuth and zenith (angle of the magnetic head relative to the "z" axis). A yaw post 210, protruding through a closed slot in the upper plate, prevents rotation in the "x-y" plane around the guide pin 208. The lead screw 204 is attached to a worm gear 218 which in turn is driven by a worm 216. Worm 216 is driven directly by a stepper motor 214. The guide pin 208 and the yaw post 210 are rigidly attached to a lower plate 220. The lead screw 204 is permitted to tilt relative to the lower plate 220, as will be described in more detail in conjunction with FIG. 6. Azimuth adjustment, if necessary, is performed by setting a screw that controls the angle between the drive chassis and the lower plate 220. FIG. 3 is a right side view of the module of FIG. 2, where "right" and "left" are defined when viewing the face of the magnetic head 200.

Figure 4:
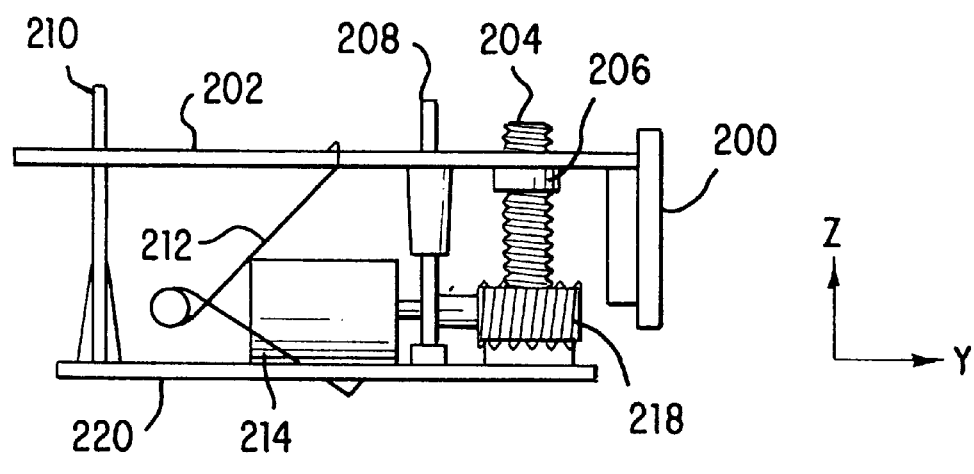
FIG. 4 is a left side view of the head positioning mechanism of FIG. 2.

FIG. 4 is a left side view of the module of FIG. 2. A spring 212 provides a downward force on the upper plate 202. The load point of the spring on the upper plate is fixed and the center of the spring coil is allowed to float. Allowing the center of the spring to float reduces the spring arm angle change, which in turn reduces load variation as the head travels between top and bottom extremes. Placing the spring load point at a fixed point close to the guide pin 208 reduces the frictional load on the guide pin.

Figure 5:
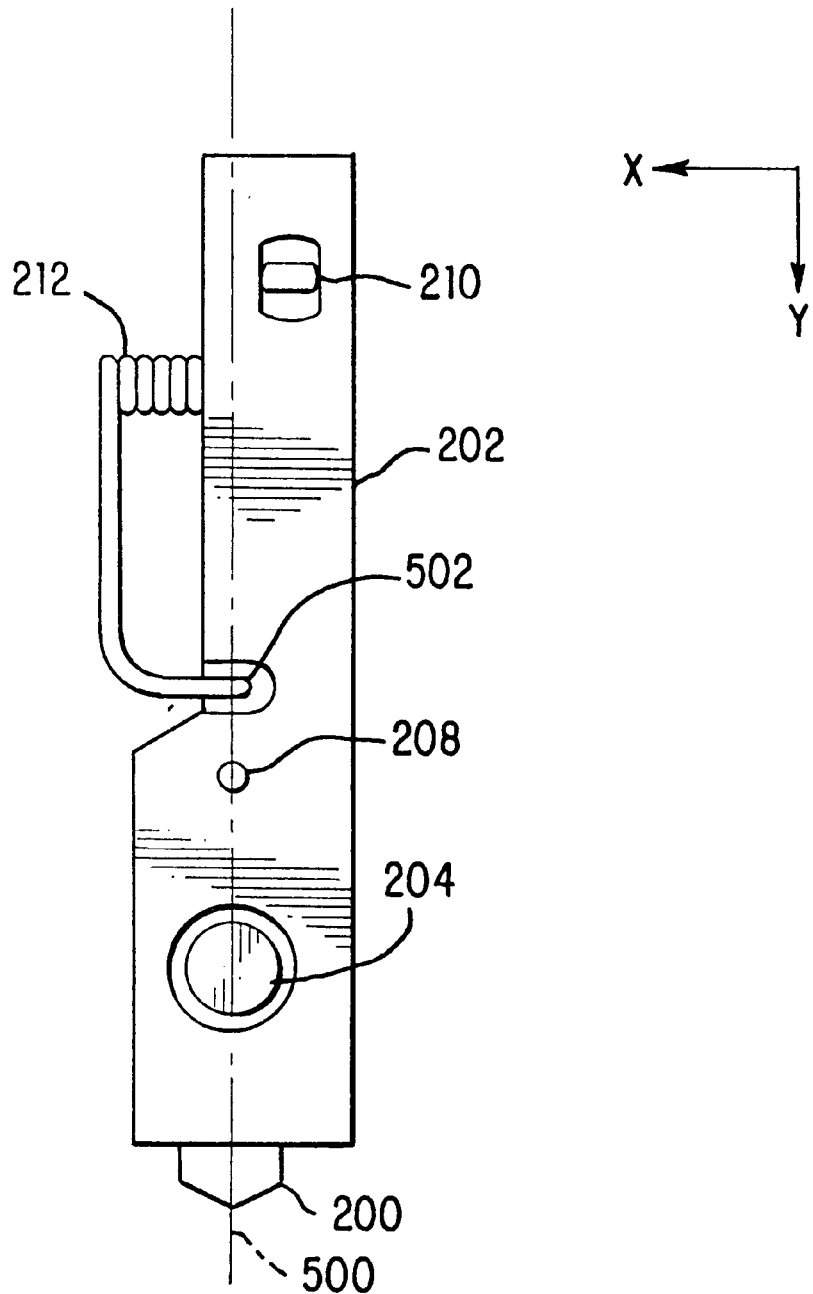
FIG. 5 is a top view of the top of the head positioning mechanism of FIG. 2.

FIG. 5 is a top view of the top of the module of FIG. 2. Note there is a system centerline 500 connecting the centerline of the head 200 to the center of the lead screw 204. Preferably, the guide pin 208, and the torsion spring load point 502 on the upper plate, are on the system centerline 500. The yaw post 210 is placed relatively far behind the guide pin 208 to easily minimize rotation of the upper plate 202 without a need for extremely tight tolerances. In order to keep frictional forces as balanced as possible, the yaw post is also near the system centerline 500.

Figure 6:
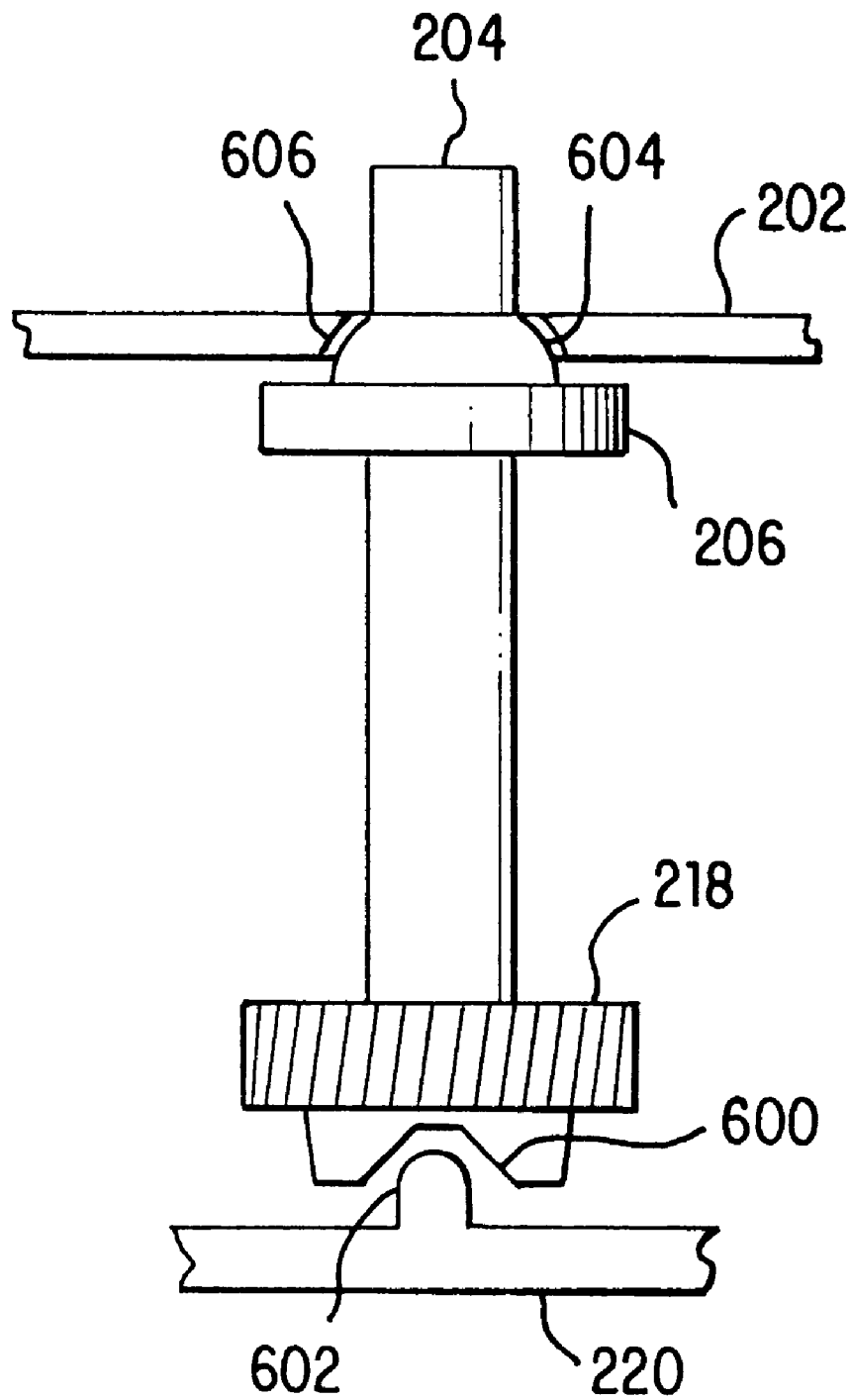
FIG. 6 is a cross section view of the lead screw mounting for the mechanism of FIG. 2.

FIG. 6 illustrates additional detail for the mounting of the lead screw. The worm gear 218 has a indented surface 600 on a base end that contacts a rounded protrusion 602 on the lower plate 220. The follower nut 206 has a rounded upper surface 604 in contact with an indented surface 606 on the upper plate 202. This arrangement permits the lead screw to tilt relative to the lower plate 220 and to tilt relative to the upper plate 202, which in turn relaxes alignment requirements for the lead screw. This arrangement is in accordance with Peace et al. Referring again to FIG. 2, since the lead screw is permitted to tilt, magnetic head azimuth and zenith are controlled by the guide pin 208, which is rigidly attached to the lower plate 220.

Figure 7A:
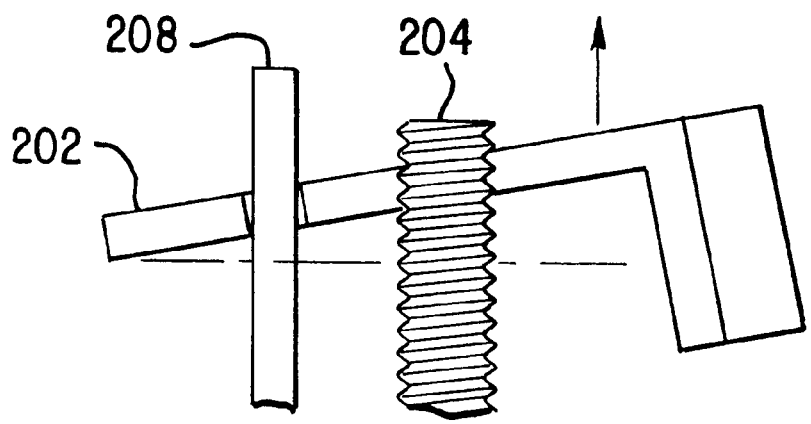
FIG. 7A is a cross section side view of a mechanical design in accordance with the invention with upward vertical movement.
Figure 7B:
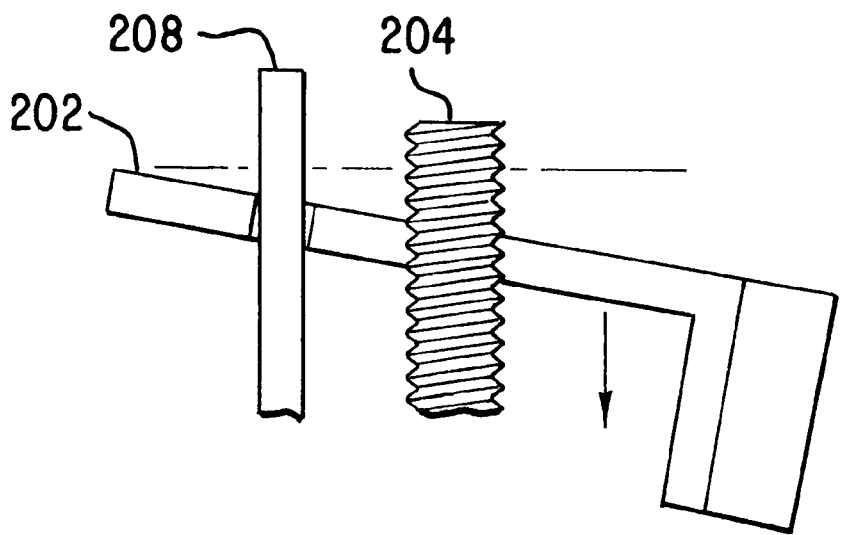
FIG. 7B is a cross section side view of the mechanical design of FIG. 7A with downward vertical movement.

FIGS. 7A and 7B illustrate the result of placing the lead screw between the guide pin and the magnetic head. As illustrated in FIGS. 7A and 7B, the pivot point is moved to the guide pin 208. If the lead screw is rotating in a direction that moves the upper plate 202 upward, the head tilts slightly upward as illustrated in FIG. 7A. However, in contrast to FIGS. 1B and 1C, when the direction of rotation of the lead screw in FIG. 7A reverses, the upper plate pivots around the guide pin 208 and immediately moves downward, as illustrated in FIG. 7B, reducing the backlash effect discussed in conjunction with FIGS. 1B and 1C. The configuration of FIG. 2 provides low drive height (the stepper motor 214 is not in-line with the lead screw), low cost mounting for the lead screw (high precision not required), with reduced backlash.

Preferably, the lead screw is mounted as close to the head as possible and the guide pin is mounted as close to the lead screw as possible. Mounting these components as close as possible minimizes upper plate cantilever from the pivot point at the guide pin. In addition, the head, the lead screw, the guide pin and the spring load position are preferably all on the system centerline. As a result, head motion system accuracy and repeatability is improved.

Note that another source of backlash is axial movement of the motor shaft. If there is axial play in the motor, the motor must take a few steps to eliminate movement within the motor. Placing a coil spring, a spring washer, or a functionally equivalent biasing force inside the motor to bias the rotor and shaft towards one end of the motor further reduces backlash. To minimize the required motor preload, it should act in the same direction as the load of the head torsion spring (212) as seen at the motor.

In a specific implementation, the stepper motor diameter is 10 mm. Gear pitches and the pitch of the lead screw 204 are chosen to produce about 50 micro inches of vertical head movement for each rotational step of the stepper motor 214 (or about 90 micro inches depending on the product). The guide pin is a teflon impregnated nickel plated pin to reduce friction as much as possible without the use of liquid lubricants.

Figure 1A:
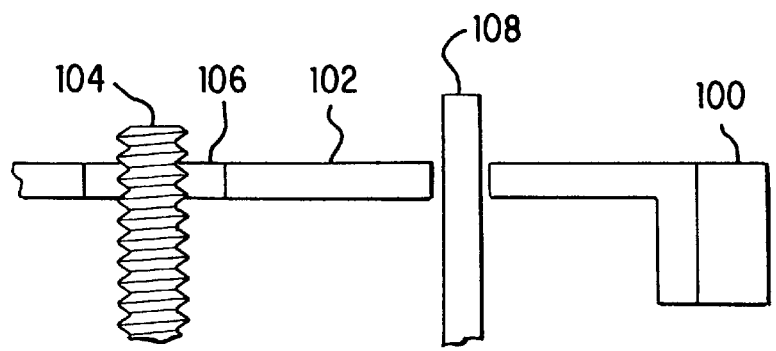
FIG. 1A (prior art) is a cross section side view of part of a typical head positioning mechanism.
Figure 1B:
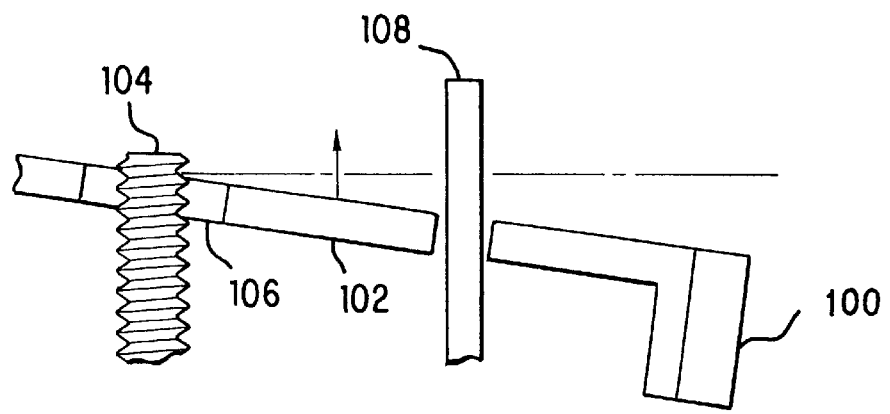
FIG. 1B (prior art) is the mechanism of FIG. 1A with upward vertical movement of the magnetic head.
Figure 1C:
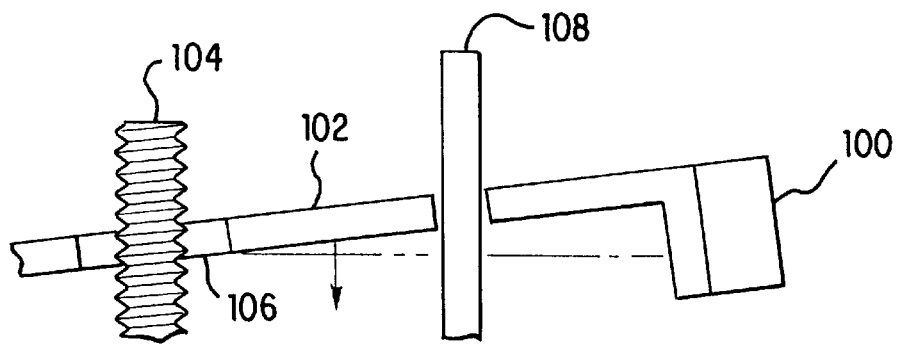
FIG. 1C (prior art) is the mechanism of FIG. 1B with downward vertical movement of the magnetic head.

In a specific design as in FIG. 1A, after reversal of direction of the stepper motor an additional 6–7 motor steps were required before the head reversed direction. In a specific implementation as in FIG. 2, after reversal of direction of the stepper motor, 1–2 additional motor steps are required before the head reverses direction.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A positioning system for a magnetic head, comprising:
   an upper plate, the magnetic head attached to the upper plate;
   a guide pin through a hole in the upper plate;
   a lead screw, having an axis of rotation, passing through the upper plate between the magnetic head and the guide pin; and
   a follower nut, threaded onto the lead screw, the follower nut in contact with the upper plate but (not attached) to the upper plate, enabling the axis of rotation of the lead screw to tilt relative to the upper plate, wherein rotation of the lead screw causes the follower nut and upper plate to move vertically and wherein an angle of the magnetic head relative to vertical is controlled by motion of the upper plate on the guide pin.

2. The positioning system of claim 1 further comprising:
   the hole in the upper plate for the guide pin being positioned on a straight line connecting a centerline of the magnetic head to a center of the lead screw.

3. The positioning system of claim 2 further comprising:
   a spring attached to a load point on the upper plate, the load point being positioned on the straight line connecting the centerline of the magnetic head to the center of the lead screw.

4. The positioning system of claim 1 further comprising:
   a lower plate, the lead screw having a base end rotatably attached to the lower plate, wherein the axis of rotation of the lead screw can tilt relative to the lower plate.

* * * * *

UNITED STATES PATENT AND TRADEMARK OFFICE
CERTIFICATE OF CORRECTION

PATENT NO. : 6,061,209
DATED : May 9, 2000
INVENTOR(S) : Fred O. Stephens et al.

It is certified that error appears in the above-identified patent and that said Letters Patent is hereby corrected as shown below:

Column 4,
Line 45, delete "but (not attached) to" and insert therefor -- but not attached to --

Signed and Sealed this

Fourth Day of June, 2002

Attest:

JAMES E. ROGAN
Attesting Officer  Director of the United States Patent and Trademark Office